United States Patent Office 2,804,477
Patented Aug. 27, 1957

2,804,477

PREPARATION OF CYCLOHEXYL SULFAMIC ACID AND ITS SALTS

Howard S. McQuaid, Wilmington, Del., assignor to E. I. du Pont de Nemours and Company, Wilmington, Del., a corporation of Delaware No Drawing. Application July 9, 1954,
Serial No. 442,425

4 Claims. (Cl. 260—563)

This invention relates to the preparation of cyclohexylsulfamic acid and its salts and is more specifically directed to the preparation of cyclohexylammonium sulfamate by a reaction between cyclohexylamine and ammonium sulfamate, and to the preparation of cyclohexylsulfamates from such cyclohexylammonium sulfamate.

It has heretofore been proposed to prepare cyclohexylammonium cyclohexylsulfamate and salts of cyclohexylsulfamic acid by a reaction between cyclohexylamine and sulfamic acid. Such processes are shown, for example, in Butler and Audrieth, J. A. C. S., vol. 61, pp. 914–15; in Berichte 30:869–70; by Paal and Lowitsch; Audrieth and Sveda, Chem. Rev., vol. 26, Feb. 1940, p. 62; and British Patent 662,800.

In such processes in which cyclohexylamine and sulfamic acid are brought together, there is an intermediate reaction between the amine and the sulfamic acid with the evolution of heat. The viscosity increases and mixing becomes difficult.

According to the present invention, ammonium sulfamate and cyclohexylamine are mixed together and allowed to react. The manner of addition, the rate and extent of heating and other process conditions are comparatively indifferent. Good results can be obtained by mixing the entire quantity of reactants and simply heating to a temperature such that ammonia leaves the system. This reaction proceeds without any appreciable energy change so that localized heating is minimized. Viscosity does not increase but becomes lower and lower as the temperature is raised during the process.

In processes of the invention the first step involves, then, mixing cyclohexylamine and ammonium sulfamate. These react according to the equation:

1. $NH_2SO_3NH_4 + C_6H_{11}NH_2 \rightarrow NH_2SO_3H_3NC_6H_{11} + NH_3\uparrow$ Cyclohexylamine is mixed with ammonium sulfamate in proportions such that there is present at least a stoichiometric quantity of cyclohexylamine. If it is later desired to prepare the cyclohexylammonium cyclohexylsulfamate at least two equivalents of the cyclohexylamine should be used for each of ammonium sulfamate. The presence of even a greater excess of cyclohexylamine is desirable in both reactions up to as high as, say, 100 percent excess, or even more. Of course, the more excess amine is used the more will need to be recycled in the process and unnecessarily large amounts should not be used.

The cyclohexamine and ammonium sulfamate can be mixed together, preferably in a pressure vessel, all at once. If preferred the ammonium sulfamate can be added stepwise to the amine, though this is not necessary. Similarly, if desired, the amine can be added to the ammonium sulfamate. The materials can also be brought together continuously in a continuously in a continuous-type process in suitable equipment. In short, the manner of addition is comparatively indifferent, which is one of the great advantages of the present process.

Immediately after the amine and ammonium sulfamate are brought together the evolution of ammonia begins according to the reaction given above. Completion of the reaction depends upon the removal of ammonia from the system as shown. If the reaction mixture is allowed to stand at ambient temperatures for a long enough time the ammonia will all escape. It is preferred, however, in commercial operation to hasten the removal of ammonia by raising the temperature of the mixture. When the temperature is raised to about 90 to 100° C. the evolution of ammonia proceeds vigorously and this condition would ordinarily be preferred in commercial operation. Temperatures between about 80 and 130° C., broadly, are satisfactory.

It should be noted that instead of mixing the materials at ambient temperatures one or both can be preheated to supply the heat to bring the mixture to temperatures within the ranges noted.

Again, it is an advantage of the present process that the mode of heating and the temperatures used are not critical.

The cyclohexylammonium sulfamate produced can be isolated by crystallization from the reaction mixture or from another solvent system, or by any other isolation procedure.

Instead of recovering the cyclohexylammonium sulfamate, however, it will ordinarily be desirable to use the reaction mixture produced by the process above described for the preparation of cyclohexylammonium cyclohexylsulfamate. This, in turn, will ordinarily be converted to cyclohexylsulfamic acid and its salts.

The conversion of the cyclohexylammonium sulfamate to cyclohexylammonium cyclohexylsulfamate can be accomplished as in the references above cited.

If in the first reaction there is used at least two equivalents of cyclohexylamine or if cyclohexylamine is added at the second stage, then the reaction just mentioned proceeds as follows:

2. $NH_2SO_3H_3NC_6H_{11} + C_6H_{11}NH_2 \rightarrow$
$C_6H_{11}NHSO_3H_3NC_6H_{11} + NH_3\uparrow$ In this second stage as indicated, there should be present at least one equivalent of cyclohexylamine for each of cyclohexylammonium sulfamate. This can be added in the first stage, as above noted, or it can be added at the beginning of the reaction shown above. An excess of cyclohexylamine can be used as in the first reaction, and it is ordinarily desirable to use some excess, say 50 to 100 percent or more.

The temperatures in this second stage can be varied as within the art from, say, 130 to 200° C. More narrowly, it is preferred to use a temperature between about 150 to 180° C.

In order to obtain such temperatures it is necessary to maintain the system under some pressure so that the cyclohexylamine will remain in the liquid phase. Ammonia can be vented through a pressure release valve or other appropriate equipment as it is formed.

The cyclohexylammonium cyclohexylsulfamate produced can be isolated as by recrystallization from the reaction system or by crystallization from another solvent.

Both the first and second reactions can be conducted in suitable inert solvents other than or in addition to cyclohexylamine. The carrying out of the second stage of the reaction in such solvents is described, for example, in British Patent 662,800.

Instead of isolating the cyclohexylammonium cyclohexylsulfamate it is preferably converted to the cyclohexylsulfamic acid or to a metal salt of cyclohexylsulfamic acid. The methods for doing this are shown in the references above cited.

In general the cyclohexylammonium cyclohexylsulfamate is first mixed with an aqueous solution or slurry of an appropriate metal hydroxide. Thus, cyclohexylammonium cyclohexylsulfamate can be mixed with an aqueous solution or slurry of hydroxides of sodium, potassium, lithium, magnesium, calcium, barium, silver, or the like. Then cyclohexylamine is removed from the system by azeotropic distillation, by extraction or any other suitable means. It is preferred to use azeotropic distillation.

The amount of metal base used should be at least that equivalent to the cyclohexylammonium cyclohexylsulfamate and more can be used without any great disadvantage.

The reaction can be shown as follows:

3.

$$C_6H_{11}NHSO_3H_3NC_6H_{11} + M_nOH \rightarrow$$
$$C_6H_{11}NHSO_3M_n + C_6H_{11}NH_2$$

In the above formula M represents a metal such as sodium, potassium, lithium, calcium, barium, magnesium, manganese, other alkali and alkaline earth metals, and other metals such as silver. Of course, $n$ represents the reciprocal of the valance of the metal.

In order that the invention may be better understood reference should be had to the following specific examples in addition to those generally given above:

*Example 1*

Two hundred and twenty parts by weight, 2.22 moles, of cyclohexylamine and 57 parts by weight, 0.50 moles, of ammonium sulfamate were mixed at room temperature and heated with agitation. At the end of one-half hour of heating the temperature had reached 110° C. and approximately one-half mole of ammonia had been evolved. Heating was continued under reflux at 133° C. for 22 additional hours. A second half mole of ammonia was liberated. The ammonia yield was 100 percent.

The reaction mixture was cooled to 100° C. To the mixture was added a water slurry containing 20.3 parts by weight, 0.55 equivalent, of calcium hydroxide and 700 parts by weight of water. Cyclohexylamine was then removed by azeotropic distillation with water.

The amine which was recovered can be reused after drying.

The residue from the distillation was evaporated to dryness in a vacuum oven at 50° C. and the resulting product analyzed. The product weighing 105.5 parts by weight, 0.488 equivalent, was obtained which is a 98 precent yield of the technical calcium cyclohexylsulfamate dihydrate with the following analysis:

| | Percent |
|---|---|
| Ca(O₃SNH–C₆H₁₀–S)₂·2H₂O | 95.6 |
| CaSO₄ | 0.6 |
| Ca(O₃SNH₂)₂ | 2.4 |
| Ca(OH)₂ | 1.4 |

The technical product thus obtained can be purified by crystallization from a suitable solvent or by adsorption of impurities upon absorbent charcoal, alumina, or silica.

*Example 2*

Four hundred and forty parts by weight, 4.44 moles, of cyclohexylamine was mixed at room temperature in a stirred autoclave with 114 parts by weight, 1.00 mole, of sulfamic acid and heated. Ammonia was allowed to escape, but a pressure of at least twenty-five pounds per square inch gauge was maintained at all times with a controlled nitrogen feed.

The mixture was heated for four hours, one-half hour being required to reach the temperature of 165° C. and the autoclave being held at that temperature for about three and one-half hours. At the end of this time the evolution of ammonia ceased after 1.90 moles had been recovered which is 95% of that theoretically liberated. The reaction mixture was then cooled to 100° C.

To the reaction mixture was added a slurry containing 42.8 parts by weight of 95 percent quality technical calcium hydroxide, 1.10 equivalents of Ca(OH)₂, in 500 parts by weight of water.

During the distillation, approximately a constant volume was maintained in the kettle by intermittent addition of water. On evaporating the distillation residue to dryness there was obtained 217.2 parts by weight of technical calcium cyclohexylsulfamate, 1.01 equivalents, which is a 100 percent yield. The product has the following analysis:

| | Percent |
|---|---|
| Ca(O₃SNH–C₆H₁₀)₂·2H₂O | 97.9 |
| CaSO₄ | 0.6 |
| Ca(OH)₂ | 1.5 |

I claim:

1. In a process for making cyclohexylammonium sulfamate the steps comprising mixing at least a stoichiometric amount of cyclohexylamine with ammonium sulfamate and heating between 80 and 130° C. to remove ammonia.

2. In a process for making cyclohexylammonium sulfamate the steps comprising mixing at least a stoichiometric amount of cyclohexylamine with ammonium sulfamate and heating between 90 and 100° C. to remove ammonia, the described heating steps being conducted under sufficient pressure to maintain cyclohexylamine in liquid phase.

3. In a process for making cyclohexylammonium cyclohexylsulfamate the steps comprising mixing at least two equivalents of cyclohexylamine with one of ammonium sulfamate, heating between 80 and 130° C. to remove ammonia, raising the temperature from 150 to 180° C. and continuing heating to effect a further removal of ammonia thus to produce cyclohexylammonium cyclohexylsulfamate, the described heating steps being conducted under sufficient pressure to maintain cyclohexylamine in liquid phase.

4. In a process for making cyclohexylammonium cyclohexylsulfamate the steps comprising mixing at least two equivalents of cyclohexylamine with one of ammonium sulfamate, heating at 80 to 130° C. to remove ammonia, then heating at a temperature between about 130 and 200° C. to remove further quantities of ammonia, and maintaining sufficient pressure on the reactions to maintain cyclohexylamine in a liquid phase.

References Cited in the file of this patent

UNITED STATES PATENTS

| 2,383,617 | Robinson | Aug. 28, 1945 |
| 2,514,955 | Kamlet | July 11, 1950 |